United States Patent
Webster

[11] 4,054,364
[45] Oct. 18, 1977

[54] APPARATUS FOR TRANSMITTING LIGHT THROUGH CASSEGRAIN OPTICS

[75] Inventor: Willard P. Webster, Ridgecrest, Calif.

[73] Assignee: The United States of America as represented by the Secretary of the Navy, Washington, D.C.

[21] Appl. No.: 654,308

[22] Filed: Feb. 2, 1976

[51] Int. Cl.² ............ G02B 5/16; G02B 5/10
[52] U.S. Cl. ............ 350/96 B; 350/96R; 350/294
[58] Field of Search ............ 350/96 R, 96 B, 96 BC, 350/199, 294

[56] References Cited

U.S. PATENT DOCUMENTS

| | | | |
|---|---|---|---|
| 3,446,980 | 5/1969 | Meier | 350/199 |
| 3,772,506 | 11/1973 | Junginger | 350/96 R |
| 3,942,127 | 3/1976 | Fluhr | 331/94.5 C |

*Primary Examiner*—John K. Corbin
*Assistant Examiner*—Stewart Levy
*Attorney, Agent, or Firm*—R. S. Sciascia; Roy Miller

[57] ABSTRACT

A method and apparatus for efficiently transmitting light through Cassegrain type optics by way of fiber optics.

3 Claims, 2 Drawing Figures

APPARATUS FOR TRANSMITTING LIGHT THROUGH CASSEGRAIN OPTICS

BACKGROUND OF THE INVENTION

Cassegrain optical systems have been found to be particularly useful in passive optical receiver systems. Their most important advantages are decreased physical length of optical system, reflective optics, and good dynamic balance for applications such as optical seeker systems. Their main disadvantage for applications involving active (transmitting) systems is the fact that the secondary mirror occludes a large portion of the transmitted light. For well collimated sources it is virtually impossible to use standard, optically fast, Cassegrain optics as collimating objectives. Optical sources which are not well collimated and which emit light in broad beams can use Cassegrain optics but at somewhat reduced efficiency as compared to refractive objective systems.

For the above reasons, at the present time it is difficult to employ Cassegrain optics in coaxial optical transceiver systems. A technique which would render Cassegrain optics suitable for use as collimating lenses for optical sources would greatly increase the optical designing alternatives available for optical transceiver systems. A particularly useful application would be in active optical seeker heads for missiles.

SUMMARY

According to the present invention a method and apparatus is provided by which light from an optical source can be efficiently transmitted through a Cassegrain objective.

DESCRIPTION AND OPERATION

Figure 1:
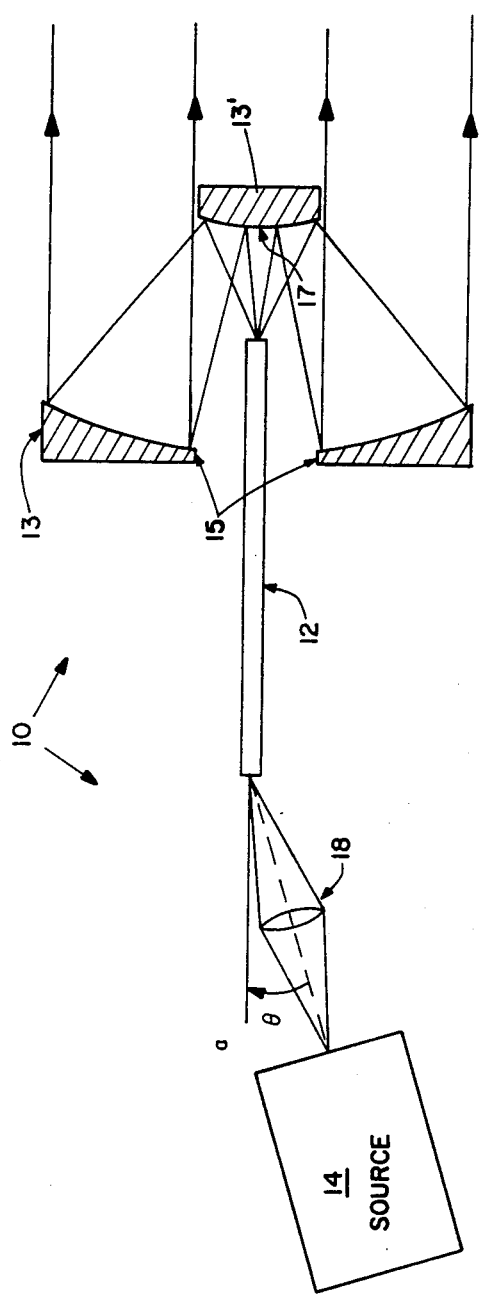
FIG. 1 is a schematic plan view partly in section of a system arranged according to the present invention.

The method according to the present invention and a preferred apparatus for improving the optical efficiency of active optical systems using Cassegrain optics is shown at 10 in FIG. 1 wherein a fiber optics bundle 12 transfers energy from an optical source 14 to the Cassegrain optics 13, 13' through an aperture 15 in the primary mirrow 13. The optical source 14 may be well collimated or it may require a focusing lens 18 to couple the energy into the fiber optics bundle 12.

The optical arrangement for a collimated optical source 14 which has a cross sectional area less than or equal to the cross sectional area of the fiber optics bundle 12 would be the same as that shown in FIG. 1 except there would be no need for the focusing lens 18. As can be seen in FIG. 1, the light from the optical source 14 is directed into the end of the fiber optics at an angle $\theta$ to the axis ($a$) of the fiber optics 12.

Figure 2:
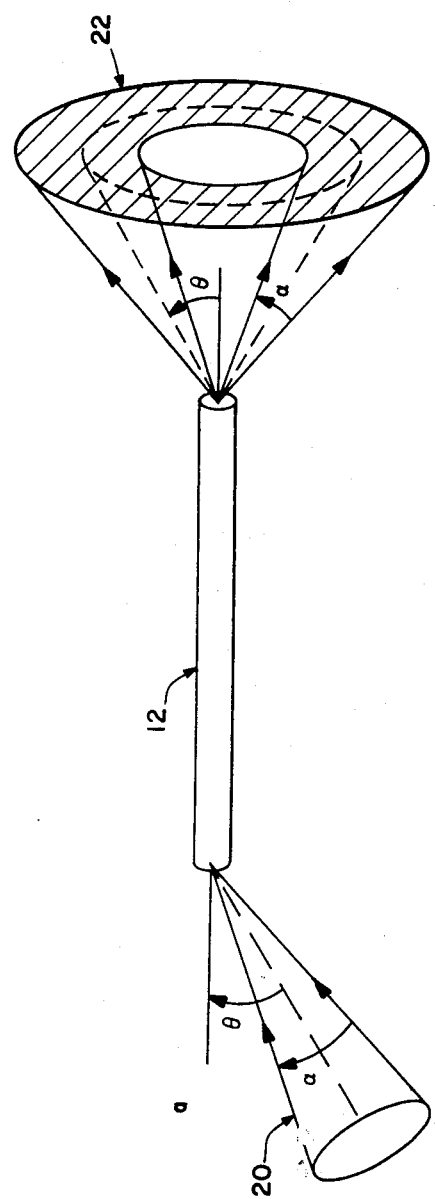
FIG. 2 is an enlarged schematic view of a portion of the system of FIG. 1.

The reason for directing the optical energy into the fiber optics at an angle $\theta$ is shown in FIG. 2. Fiber optics have the unique characteristic shown in FIG. 2 that if light 20 enters one end of the fiber optics 12 at an angle $\theta$, it will exit the opposite end of the fiber optics as an annular beam 22 with the cone angle of the annulus equal to $\theta$. The beamwidth of the annular beam is determined by the divergence $\alpha$ the light incident on the end of the fiber optics.

Hence, as is seen in FIG. 2, the fiber optics converts the light from the source into an annular beam. The cone angle of the annular beam, $\theta$, can be varied by varying the angle of incidence of the source light on the end of the fiber optics. As shown in FIG. 1, conversion of the source beam into an annular beam is very useful because the energy out of the fiber optics now bypasses the occluded spot 17 on the secondary mirror 13'. Using this method for transmitting optical energy through Cassegrain optics significantly increases the optical efficiency of the system for both well collimated and diffuse optical sources.

The analysis of the theory of operation, although unnecessary to make and use the invention, follows well understood optical principals. Fiber optics 12 is a bundle of small strands. Each strand projects an annulus as shown. The total path length traversed by the light permits the annulus to expand to a size where the diameter of annulus 22 is far larger than the diameter of the fiber optics 12 and obviously the strands are even more insignificant in comparison. The size of the annulus depends on the source angle of incidence and the distance from the end of the fiber optics 12. Each strand produces an annulus whose center is shifted a fixed amount equal to the diameter of the individual strands that are bound together. Since the annulus has been expanded to a far larger diameter than the fiber optics 12, the amount of light that the remaining strands emit into the center of any single strand annulus is a fringe effect. The resultant distribution of intensity across the annulus is as expected. That is, the intensity, if measured, will be found to be greatest in the center and tapering off towards the edges. It should be noted that FIG. 2 is not drawn to scale.

It should also be noted that, if the angle of incidence is too large, the source beam will not enter the end of the fiber optics 12. This critical angle as is well known, depends on the particular materials used.

While focusing is not necessary, the source light can be made to enter the fiber optic bundle more efficiently if it is focused to the approximate size of the fiber optic bundle.

Lastly, it should be noted that the annulus is produced by light that is off center in the fiber optic strands. Light that enters exactly on the center of a strand reflects back and forth on a diameter of the strand. Light entering the individual strand off center retains the same angular reflection as it propagates down the strand but now has an additional lateral deflection which rotates it around the strand causing the observed cone shaped exit distribution pattern.

ADVANTAGES AND NEW FEATURES a. The invention will work with either well collimated light sources or light sources which emit light in divergent beams.

b. Optical energy from bulky optical sources may be easily transferred to the focus of the Cassegrain optics. Hence, the source and detector of an active optical seeker head can be located in a convenient position well behind the seeker optics.

c. Use of flexible fiber optics allows the Cassegrain objective to be aimed in any desired direction without degrading its transmission efficiency. This result is important for the design of active optical seekers.

ALTERNATIVES

The invention described herein has been applied to Cassegrain optics. In addition, the method is also applicable to any reflective optical system that employs primary and secondary mirrors in which the secondary mirror occludes part of the received or transmitted energy.

What is claimed is:

1. An active optical system comprising:
   a light source;
   a centrally apertured primary mirror where the aperture is small compared to the overall size of the primary mirror;
   a secondary mirror placed with respect to said primary mirror so it can receive light from the aperture and reflect it onto the primary mirror;
   a fiber optic bundle placed with respect to said light source and said primary mirror such that the angle of incidence to receive light from the source and transmit it through the aperture and exit as annularly shaped beam toward the secondary mirror is less than the critical angle of total reflection for the given materials used between the source and the fiber optic bundle; and
   means for directing the light so that the angle of incidence on the fiber optic bundle is other than zero degrees for plane waves and so that the non zero angle for converging light refers to the incident angle of the ray traveling along the axis of symmetry of the converging light.

2. An active optical system as recited in claim 1 wherein said source of optical energy comprises a laser.

3. An active optical system as recited in claim 2 wherein said coupling means comprises an optical focusing lens.

* * * * *